United States Patent [19]

Hamaue

[11] Patent Number: 5,222,994
[45] Date of Patent: Jun. 29, 1993

[54] RETRACTOR SHAFT-ROTATING PRETENSIONER

[75] Inventor: Tetsuya Hamaue, Shiga, Japan

[73] Assignee: Takata Corporation, Tokyo, Japan

[21] Appl. No.: 849,518

[22] Filed: Mar. 11, 1992

[30] Foreign Application Priority Data

Mar. 12, 1991 [JP] Japan .................. 3-70298

[51] Int. Cl.$^5$ ............................. B60R 22/46
[52] U.S. Cl. .................................. 242/107
[58] Field of Search ......... 242/107, 107.4 A, 107.4 B, 242/107.4 R; 280/806, 807; 297/478, 480

[56] References Cited

U.S. PATENT DOCUMENTS

5,098,030  3/1992  Kosugi ................. 242/107
5,114,090  5/1992  Lindblad .............. 242/107

FOREIGN PATENT DOCUMENTS

3531856 12/1986 Fed. Rep. of Germany ...... 280/806
1-168547  7/1989 Japan .
0025052  2/1991 Japan ................... 280/806

Primary Examiner—John M. Jillions
Attorney, Agent, or Firm—Brumbaugh, Graves, Donohue & Raymond

[57] ABSTRACT

A retractor shaft-rotating pretensioner for a vehicle seat belt retractor comprises a cable, a power source coupled to a pulling portion of the cable for pulling the cable, and a mechanism for coupling a pulled portion of the cable to a reel shaft of the belt retractor when the cable is pulled to transmit rotation to the reel shaft. The coupling mechanism includes an annular pulley positioned substantially coaxially with the reel shaft radially outwardly thereof. The pulled portion of the cable is wound onto the pulley. Latches are mounted on the pulley for guided movement radially thereof into engagement with the reel shaft. The latches are releasably attached to the pulley by shear pins in spaced apart relation from the reel shaft with portions thereof engaged by the pulled portion of the cable such that when the cable is pulled by the power source, the latches are released by shearing of the shear pins and moved by the pulled portion of the cable into engagement with the reel shaft.

1 Claim, 4 Drawing Sheets

# RETRACTOR SHAFT-ROTATING PRETENSIONER

BACKGROUND OF THE INVENTION

The present invention relates to a belt pretensioner for a vehicle seat belt system and, in particular, to a pretensioner for tightening the belt by rotating the belt reel shaft of a seat belt retractor in the belt-winding direction.

Some vehicle seat belt systems have a pretensioner for tightening a belt worn by an occupant of the vehicle in order to tightly restrain the body of the occupant in an emergency and to prevent the occupant from undergoing a secondary collision within the vehicle. Such a pretensioner is disclosed in Japanese Provisional Patent Publication No. 1-168547.

In the pretensioner of Japanese Publication No. 1-168547, a plurality of segmental arcuate pieces arranged in a circle around a belt reel shaft of a retractor are normally held in clearance from the shaft so that the retractor can function normally. When a cable wound around the pieces is pulled by a power source, the pieces are forced into engagement with the reel shaft and transmit displacement of the cable to the reel shaft such as to wind a portion of the belt onto the belt reel of the retractor. Although the pretensioner of JP 1-168547 requires relatively few components, inasmuch as the arcuate pieces are held in the "set" condition by the cable, the proper positioning of the pieces requires great care when the cable is wound around the pieces at assembly, lest the pieces be located too far from or too close to the belt reel shaft. Inaccurate positioning of the pieces can result in difficulties in the normal operation of the retractor due to interference between the pieces and the reel shaft or incorrect operation of the pretensioner when it operates, such as instability in the proper engagement of the pieces with the reel shaft.

SUMMARY OF THE INVENTION

An object of the present invention is to provide a retractor shaft-rotating pretensioner in which proper assembly and operation are ensured, thereby making the pretensioner reliable in operation and ensuring correct normal operation of the retractor.

The forgoing object is attained, in accordance with the present invention, by a retractor shaft-rotating pretensioner for a vehicle seat belt retractor comprising a cable, a power source coupled to a pulling portion of the cable for pulling the cable, and a mechanism for coupling a pulled portion of the cable to a reel shaft of the belt retractor when the cable is pulled to transmit rotation to the reel shaft. The coupling mechanism includes an annular pulley positioned substantially coaxially with the reel shaft radially outwardly thereof. The pulled portion of the cable wound is wound onto the pulley. Latches are mounted on the pulley for guided movement radially thereof into engagement with the reel shaft. The latches are releasably connected to the pulley in spaced apart relation to the reel shaft with portions thereof engaged by the pulled portion of the cable such that when the cable is pulled by the power source, the latches are disconnected from the pulley and moved into engagement with the reel shaft.

By providing a pulley for the pulled portion of the cable and by releasably connecting the latches to the pulley, proper clearance between the latches and the reel shaft is assured, and the need for special attention to the positions of the latches when the pretensioner is assembled is eliminated. Accordingly, reliability of both the normal operation of the retractor and the operation of the pretensioner are assured. Moreover, the latches are guided by the pulley into engagement with the reel shaft when then pretensioner operates.

For a better understanding of the invention, reference may be made to the following description of an exemplary embodiment, taken in conjunction with the accompanying drawings.

DESCRIPTION OF THE EMBODIMENT

Figure 1:
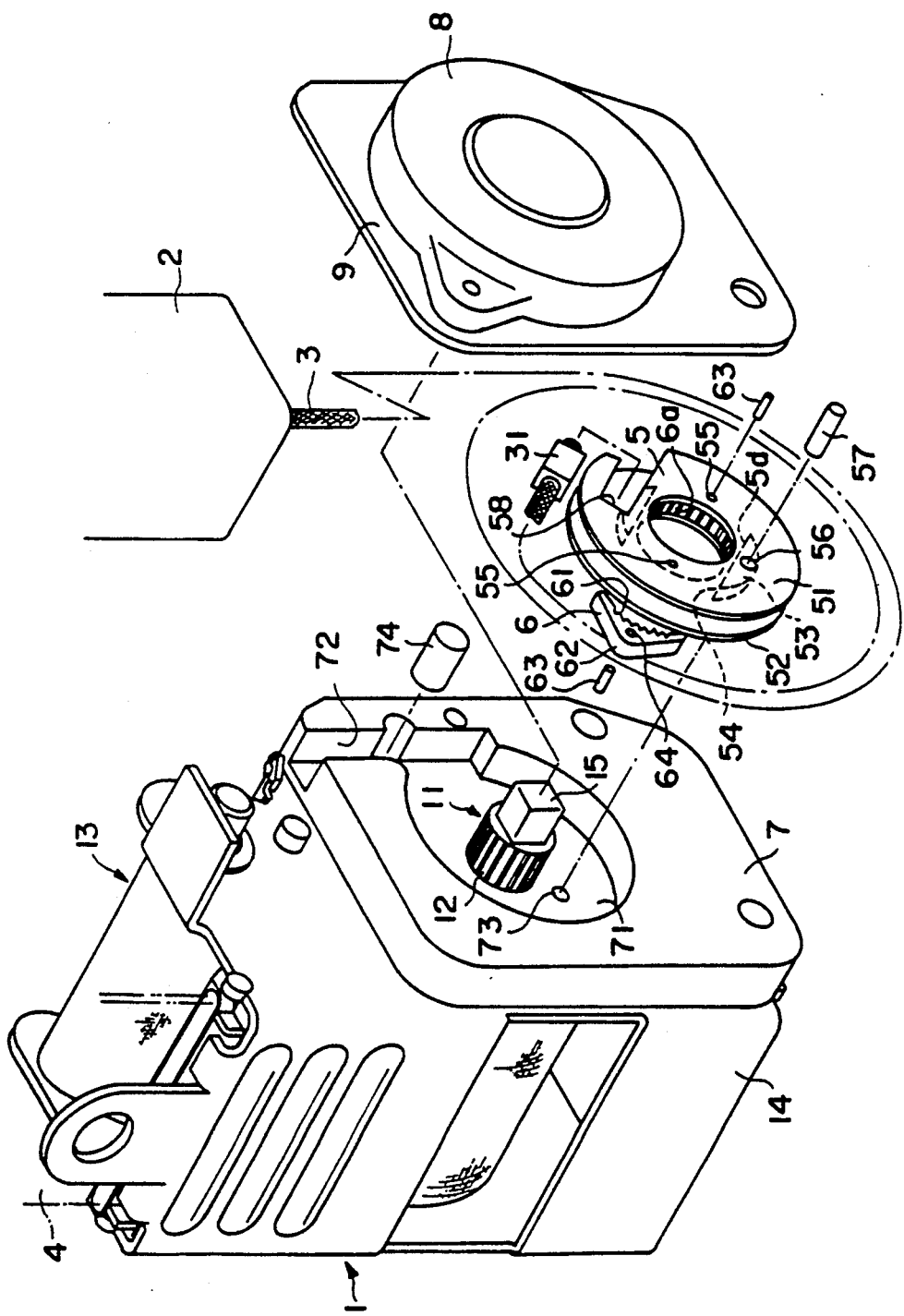
FIG. 1 is an exploded pictorial view of an embodiment of a pretensioner according to the present invention.

In the embodiment, referring to FIG. 1, a stranded wire cable 3 is connected between a power source 2 and a pulley 5 that is arranged to be coupled to a belt reel shaft 11 of a seat belt retractor 1 by latches 6 when the cable 3 is pulled by the power source. Pretension is imparted to a belt 4 of a seat belt system upon rotation of the reel shaft 11 in the belt-winding direction. Thus, a belt retractor shaft-rotating type pretensioner is provided.

In particular, the seat belt retractor 1 is of a previously known design that includes a belt-clamping mechanism 13. A fixed member in the form of a block 7 is mounted on one side wall of the retractor frame 14 by suitable means (not shown). The block 7 has a generally circular pulley-receiving recess 71 that receives the pulley 5 and a channel 72 leading generally tangentially from the recess in the direction of the power source 2 through which the cable 3 passes from the pulley to the power source 7.

A pinion gear 12 having a square (or otherwise non-circular) hole is affixed on a portion of a matching shape of the retractor reel shaft 11, whereby the gear rotates with the reel shaft. A portion 15 of the reel shaft projects outwardly with respect to the gear 12 and is connected to one end of a spiral winding spring 8 of the retractor.

The pulley 5 has relatively large flanges 51 and 52, and the cable 3 is wound in a spiral in the radial direction by lap winding. On a hollow hub portion 53 of the pulley 5, which connects the flanges 51 and 52 of the pulley 5, there is provided a rectangular hole or guideway 54 passing through the center of the hub and extending in a direction traverse to the axis of the hub. The guideway 54 receives a pair of latches 6, which are slidably engaged with both edges and their inner and outer surfaces guided in the radial direction. (Only one of the latches is shown in FIG. 1, but both are shown in other figures). Each latch 6 has internal teeth 61 formed on its inner edge, while the outer periphery 62 is V-shaped and serves as an operational connector with the cable 3. Near the center of each latch is a small hole 64 that extends in the lateral direction and receives a latch-holding pin 63 that serves as a shear pin and is received in a small hole 55 in each of the inner and outer flanges 51 and 52 of the pulley 5. The pulley 5 has a hole 56, which completely passes through it in the axial direction and receives a pulley-holding pin 57. The pin 57 functions as a shear pin, one end being received in a hole 73 of the block 7.

The above latch-holding pins 63 and the pulley-holding pin 57 comprise shear pins with different shear strengths, the latch-holding pins 63 being designed to break at a lower shear load than that of the pulley-holding pin 57.

A part of the outer flange 51 of the pulley 5 is cut out in a generally tangential direction to form a notch 58. The pulled end of the cable 3 is attached to the pulley 5 by hooking into the notch 58 a stop block 31 that is crimped on the end of the cable 3. The cable 3 makes almost a full turn around the inner periphery of the pulley 5 from the starting end (the block), passes over the block 31, and makes one more turn around the pulley. The pulling portion 32 of the cable passes through the channel 72 in the block 7 and is connected to a piston (not shown) of the power source 2.

The outward face of the block 7 is covered with a cover 9, and the winding spring 8 of the retractor 1 is mounted under the cover 9. Reference numeral 74 designates a cable guide pin, which is located on one side of the cable-pulling channel 72.

Figure 2:
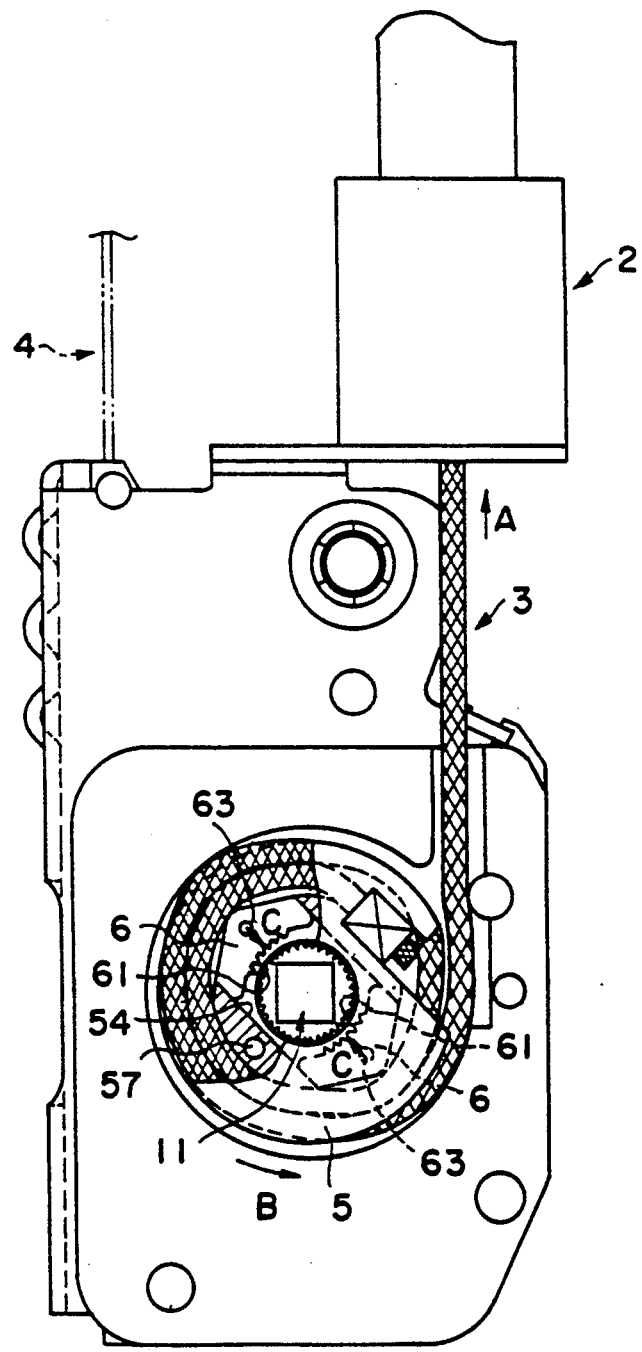
FIG. 2 is an end elevational view, portions of which are broken away in cross section, showing the configuration of the pretensioner in the "set" position.

FIG. 2 shows the pretensioner of FIG. 1 in the "set" condition. The latches 6 are positioned and fixed at the predetermined positions in the guideway 54 of the pulley 5 by means of the respective latch-holding pins 63, which are received through the small hole 55 of the pulley flange and the hole 64 (FIG. 1). The pulley-holding pin 57, which passes through the hole 56 in the pulley 5 and is received in the hole 73 (FIG. 1) in the block 7, prevents the pulley 5 from rotating. In the present embodiment, the centering and the positioning of the pulley 5 in the set position are maintained by the shear pin 57 and the cable 3, which is sufficiently stiff to keep the pulley from pivoting about the shear pin 57. Therefore, the external teeth of the gear 12 and the internal teeth 61 of the latches 6 are not engaged and are at a certain clearance. In this "set" state, the retractor 1 can function normally to wind the belt onto the reel shaft and permit the belt to be unwound from the reel shaft.

When a large acceleration G is applied in a vehicle collision under this set condition and the power source 2 is triggered in response to an acceleration sensor (not shown), the cable 3 is pulled by the power source 2 in the direction A, and a rotating force is applied counterclockwise in the direction B on the pulley 5 with the cable 3 wound on it. The pulley-holding pin 57 for positioning and holding the pulley 5 initially prevents the rotation of the pulley 5 by the pulling force applied to it by the cable 3, and the latches 6 of the pulley 5 receive a force generally radially toward the reel shaft 11 of the retractor in the direction C by the tightening of the cable 3. The latch-holding pins 63 holding the latches 6 on the pulley are sheared by these forces, and a pair of latches 6 are displaced inwardly such as to engage the internal teeth 61 of the latches with the external teeth of the gear 12.

Figure 3:
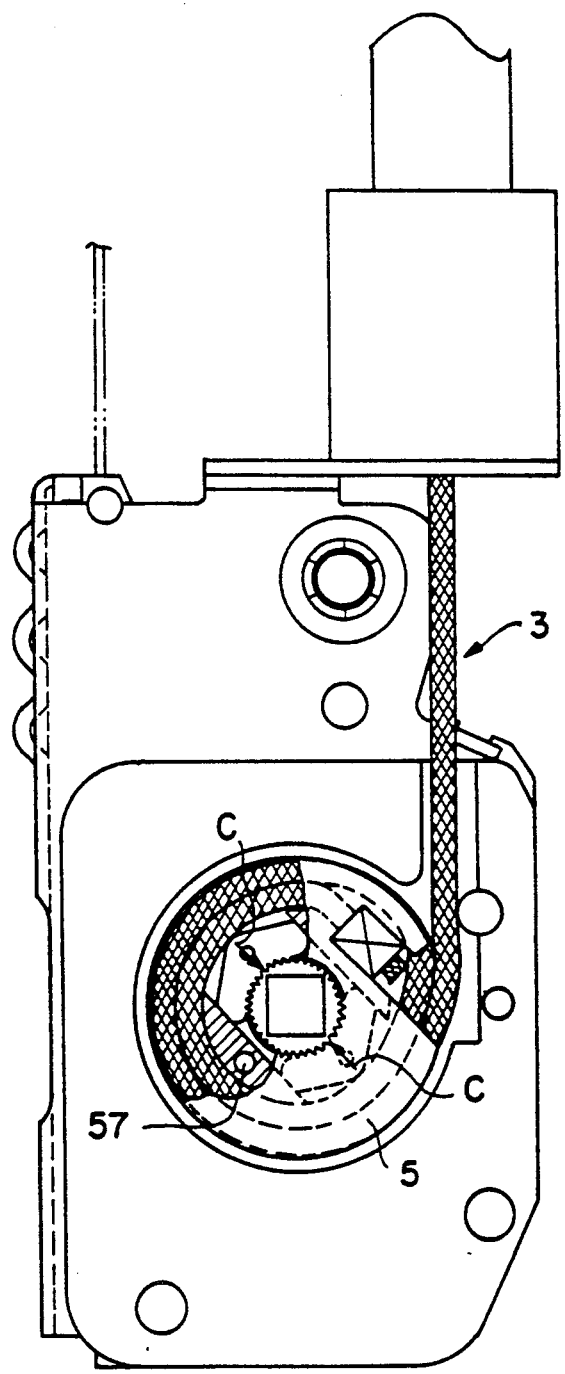
FIG. 3 is a side view similar to FIG. 2 but showing the configuration of the pretensioner just after the power source has been triggered.

FIG. 3 shows the condition of the embodiment after shearing of the latch-holding pins. After the internal teeth of the latches are engaged with the external teeth of the gear, as described above, the pulling force exerted by the pulling portion of the cable 3 works as a force to rotate the pulley 5, and the pulley-holding pin 57 is also sheared.

Figure 4:
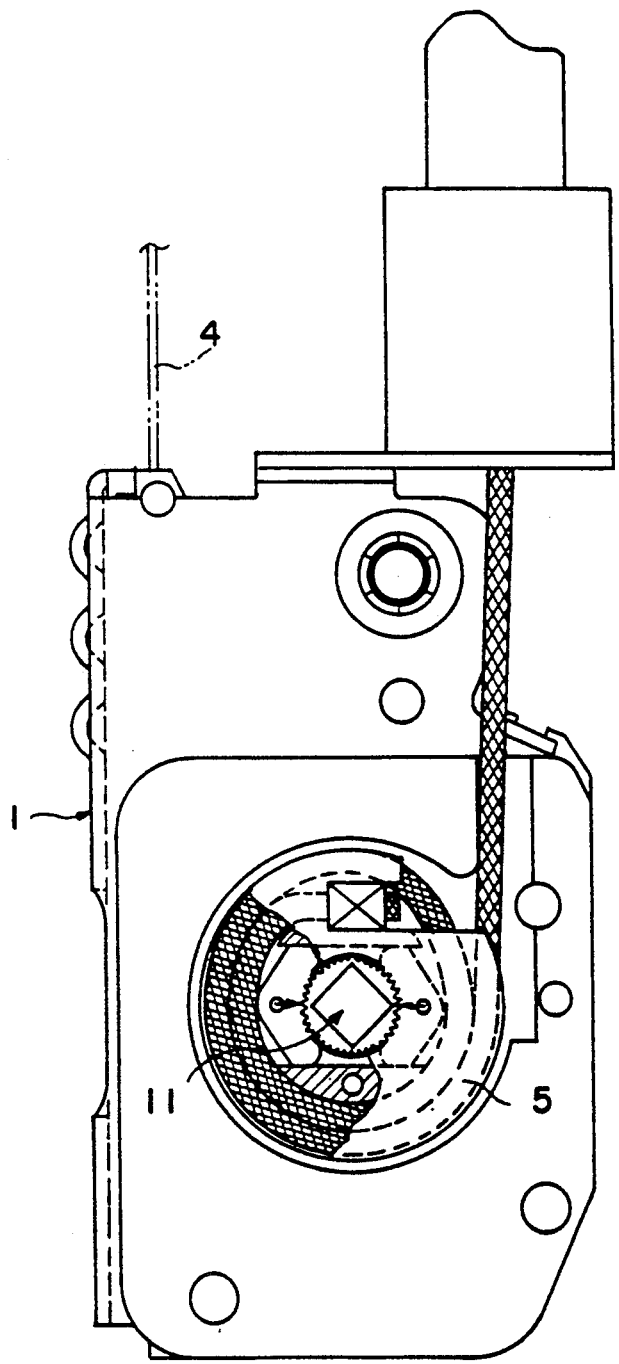
FIG. 4 is a side view similar to FIG. 3 showing the configuration of the pretensioner at a later stage of its operation.

As shown in FIG. 4, the rotation of the pulley is transmitted to the belt reel shaft, and a portion of the belt 4 is wound onto the retractor 1 within a short time, thereby pretensioning the belt firmly against the body of the occupant before the occupant is thrown forward by an inertia force.

Because the cable 3 is wound in the radial direction on the pulley 5 by lap winding in the pretensioner of the present embodiment, a pulling stroke large enough to provide the desired pretension in the belt can be ensured without increasing the axial size of the mechanism. By releasably connecting the latches to the pulley, the desired clearance between the latches and the reel shaft is obtained without the need to establish the clearance when the cable is wound during assembly. When the pretensioner operates, the latches are positively guided by the pulley into proper engagement with the belt reel shaft.

Having now fully described the embodiment, it will be apparent to those skilled in the art that many changes and modifications can be made according to the actual operating conditions and the selection of component materials without departing from the spirit or scope of the invention as set forth in the claims.

For example, whereas in the embodiment the pulled portion of the cable 3 is wound on the pulley 5 by lap winding and the end is connected to the pulley, an end portion of the cable can be extended from a connection to the pulley through a notch on the inner flange of the pulley and into a guide groove in the block, whereby frictional engagement of the end portion with the peripheral groove provides a braking force on the pulled portion of the cable to assist in maintaining the latches firmly engaged with the reel shaft.

Also, it is possible to provide a cylindrical bearing on the outermost portion of the gear on the reel shaft to ensure centering of the pulley by supporting the inner periphery of the outer flange of the pulley on the bearing.

Further, a pushing member may be used instead of the holding pin 57 to hold the pulley, and the diameter-reducing action of the cable may be induced by hindering the rotation of the pulley by friction force.

As described above, it is possible according to the pretensioner of the present invention to automatically perform the centering of the latches by carrying out the centering of the pulley in the setting condition, because the latches are operationally connected with the cable by supporting the latches on the pulley and by attaching the cable on the pulley. Therefore, it is possible to eliminate the difficulty of setting. Also, because the latches are guided by the pulley in operation, the engagement of the take-up shaft with the latches is stably maintained when the pretensioner operates. Thus, a retractor shaft rotating pretensioner is provided that attains enhanced reliability and stable operation without difficulties at assembly.

I claim:

1. A retractor shaft-rotating pretensioner for a vehicle seat belt retractor comprising a cable, power source means coupled to a pulling portion of the cable for pulling the cable, and means for coupling a pulled portion of the cable to a reel shaft of the belt retractor when the cable is pulled to transmit rotation to the reel shaft, the coupling means including an annular pulley positioned substantially coaxially with the reel shaft radially outwardly thereof, the pulled portion of the cable wound being wound onto the pulley, latches mounted on the pulley for guided movement radially thereof into engagement with the reel shaft, and attachment means for releasably attaching the latches to the pulley in spaced apart relation from the reel shaft with portions thereof engaged by the pulled portion of the cable such that when the cable is pulled by the power source the latches are released and moved into engagement with the reel shaft.

* * * * *